United States Patent
Kawada et al.

(10) Patent No.: US 8,243,444 B2
(45) Date of Patent: Aug. 14, 2012

(54) ELECTRONIC EQUIPMENT PROVIDED WITH GRIP MECHANISM

(75) Inventors: Yoshihiro Kawada, Osaka (JP); Masaru Furujiku, Osaka (JP)

(73) Assignee: Panasonic Corporation, Osaka (JP)

( * ) Notice: Subject to any disclaimer, the term of this patent is extended or adjusted under 35 U.S.C. 154(b) by 119 days.

(21) Appl. No.: 12/963,917

(22) Filed: Dec. 9, 2010

(65) Prior Publication Data

US 2011/0205696 A1 Aug. 25, 2011

(30) Foreign Application Priority Data

Feb. 19, 2010 (JP) ................................ 2010-035058

(51) Int. Cl.
*G06F 1/16* (2006.01)
(52) U.S. Cl. .................................................. 361/679.59
(58) Field of Classification Search .............. 361/679.59
See application file for complete search history.

(56) References Cited

U.S. PATENT DOCUMENTS

| | | | | |
|---|---|---|---|---|
| 6,017,106 A * | 1/2000 | Adams et al. | ............... | 312/223.2 |
| 6,049,813 A * | 4/2000 | Danielson et al. | ............ | 708/100 |
| 6,543,695 B1 * | 4/2003 | Hamilton et al. | ........ | 235/462.43 |
| 6,995,977 B2 * | 2/2006 | Yang | ......................... | 361/679.55 |
| 7,023,692 B2 * | 4/2006 | Mansutti et al. | ......... | 361/679.56 |
| 7,301,757 B2 * | 11/2007 | Lee et al. | ................. | 361/679.27 |
| 7,715,192 B2 * | 5/2010 | Takahama | ................ | 361/679.59 |
| 7,764,488 B2 * | 7/2010 | Calvarese | ............ | 361/679.03 |
| 7,778,026 B2 * | 8/2010 | Mitchell | .................. | 361/679.55 |
| 8,120,896 B2 * | 2/2012 | Mori et al. | ............... | 361/679.03 |
| 8,144,456 B1 * | 3/2012 | Kunert et al. | ............ | 361/679.37 |
| 2002/0044406 A1 * | 4/2002 | Shimoda et al. | .............. | 361/679 |
| 2003/0202318 A1 * | 10/2003 | Lee | ............................... | 361/683 |
| 2004/0022021 A1 * | 2/2004 | Bovino | ........................ | 361/683 |
| 2004/0226973 A1 * | 11/2004 | Kao | ............................... | 224/218 |
| 2006/0054704 A1 * | 3/2006 | Fitch et al. | ............... | 235/472.01 |
| 2009/0059481 A1 * | 3/2009 | Taylor | ........................... | 361/679 |
| 2009/0109633 A1 * | 4/2009 | Rajala et al. | ................. | 361/726 |
| 2010/0296235 A1 * | 11/2010 | Takemasa et al. | ....... | 361/679.21 |

FOREIGN PATENT DOCUMENTS

| | | | |
|---|---|---|---|
| EP | 2244155 A1 | * | 10/2010 |
| JP | 2000-105630 | | 4/2000 |
| JP | 2009205531 A | * | 9/2009 |
| JP | 2011013738 A | * | 1/2011 |
| JP | 2011192263 A | * | 9/2011 |

* cited by examiner

*Primary Examiner* — Lisa Lea Edmonds
(74) *Attorney, Agent, or Firm* — Hamre, Schumann, Mueller & Larson, P.C.

(57) ABSTRACT

Electronic equipment includes a protruding member on a bottom surface of a first housing. Thus, when a user holds a notebook PC with one hand, a palm is brought into contact with the protruding member, whereby the hand is less likely to shift relative to the first housing. Consequently, the notebook PC can be held in a stable position. Further, the protruding member is attachable/detachable with respect to the first housing. Thus, it is possible to place the electronic equipment on a planar surface such as a desk surface in a stable position by removing the protruding member.

7 Claims, 14 Drawing Sheets

ELECTRONIC EQUIPMENT PROVIDED WITH GRIP MECHANISM

BACKGROUND

1. Field of the Application

The present application relates to electronic equipment provided with a grip mechanism.

2. Description of Related Art

In recent years, notebook personal computers (hereinafter, referred to as "notebook PCs") are developed so as to allow a user to hold the same with one hand.

JP 2000-105630 A discloses a portable computer that is provided with a fixed belt through which a user can insert his/her hand, on a rear surface of a housing of the notebook PC. The user can hold the portable computer disclosed in JP 2000-105630 A with one hand by inserting his/her hand through the fixed belt.

However, when the user holds a main body of the portable computer disclosed in JP 2000-105630 A with one hand by inserting his/her hand through the fixed belt, the hand may shift relative to the main body, which makes it difficult to hold the main body in a stable position.

SUMMARY

With the foregoing in mind, it is an object of the present application to provide electronic equipment including: a housing; a pair of belt locking portions that are formed on one surface of the housing and are capable of locking a grip belt; and a protruding member locking portion that is formed on the one surface and is capable of locking a protruding member. The protruding member is attachable/detachable with respect to the protruding member locking portion.

DETAILED DESCRIPTION OF THE EMBODIMENTS

Embodiment 1

1. Configuration of Electronic Equipment

Figure 1:
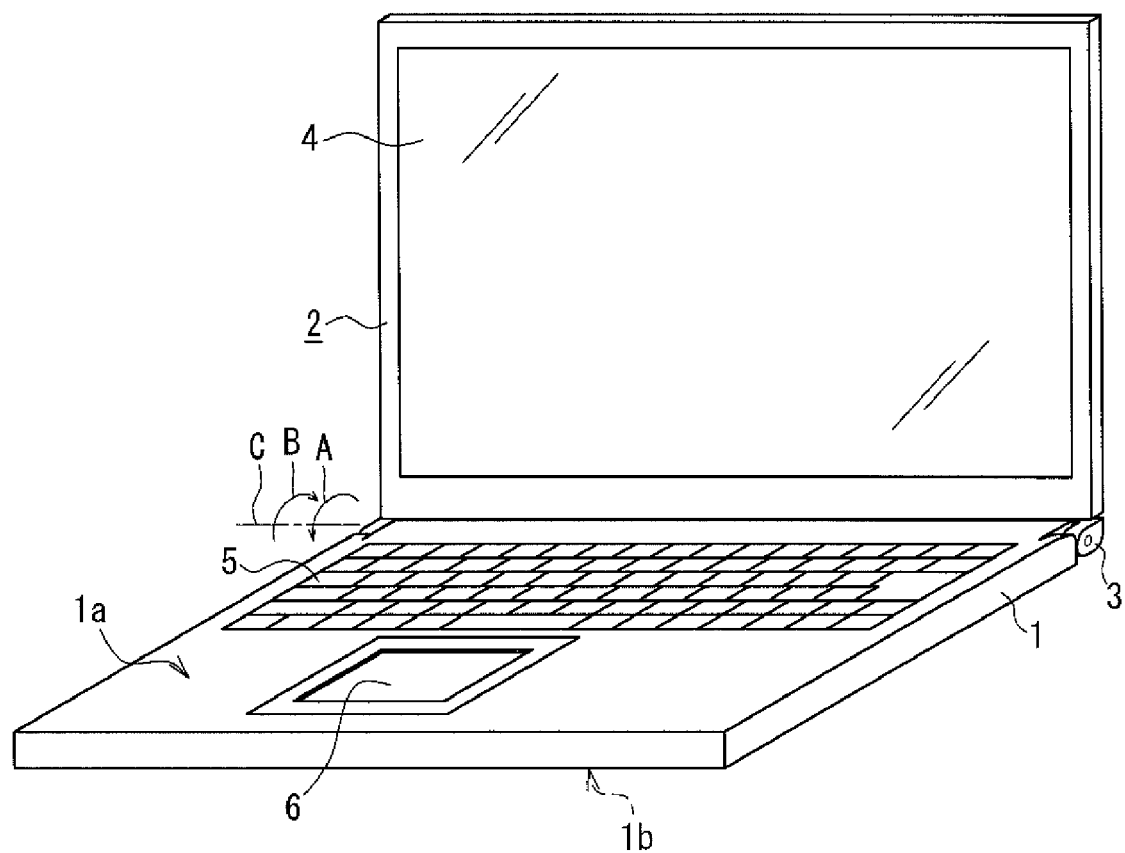
FIG. 1 is a perspective view of a notebook PC according to an embodiment.

FIG. 1 is an external perspective view of a notebook PC as an example of electronic equipment according to the present embodiment. Although the notebook PC is given as an example of the electronic equipment in the present embodiment, any equipment that at least can be held with one hand, such as a folding mobile phone terminal, a folding electronic game machine, and a folding electronic dictionary terminal, is also applicable.

As shown in FIG. 1, the notebook PC includes a first housing 1 and a second housing 2. The first housing 1 incorporates a circuit board mounted with various electric elements, a hard disk drive, and the like. The second housing 2 includes a liquid crystal display 4. The first housing 1 and the second housing 2 are supported mutually rotatably by a hinge portion 3. The hinge portion 3 includes a shaft about which the first housing 1 and the second housing 2 are supported rotatably.

A keyboard 5 and a pointing device 6 are provided on a top surface 1*a* of the first housing 1. The keyboard 5 receives an operation of inputting various characters by a user. The pointing device 6 operates by the user contacting an operation surface and is capable of moving a cursor displayed on the liquid crystal display 4 to a desired position.

Figure 2A:
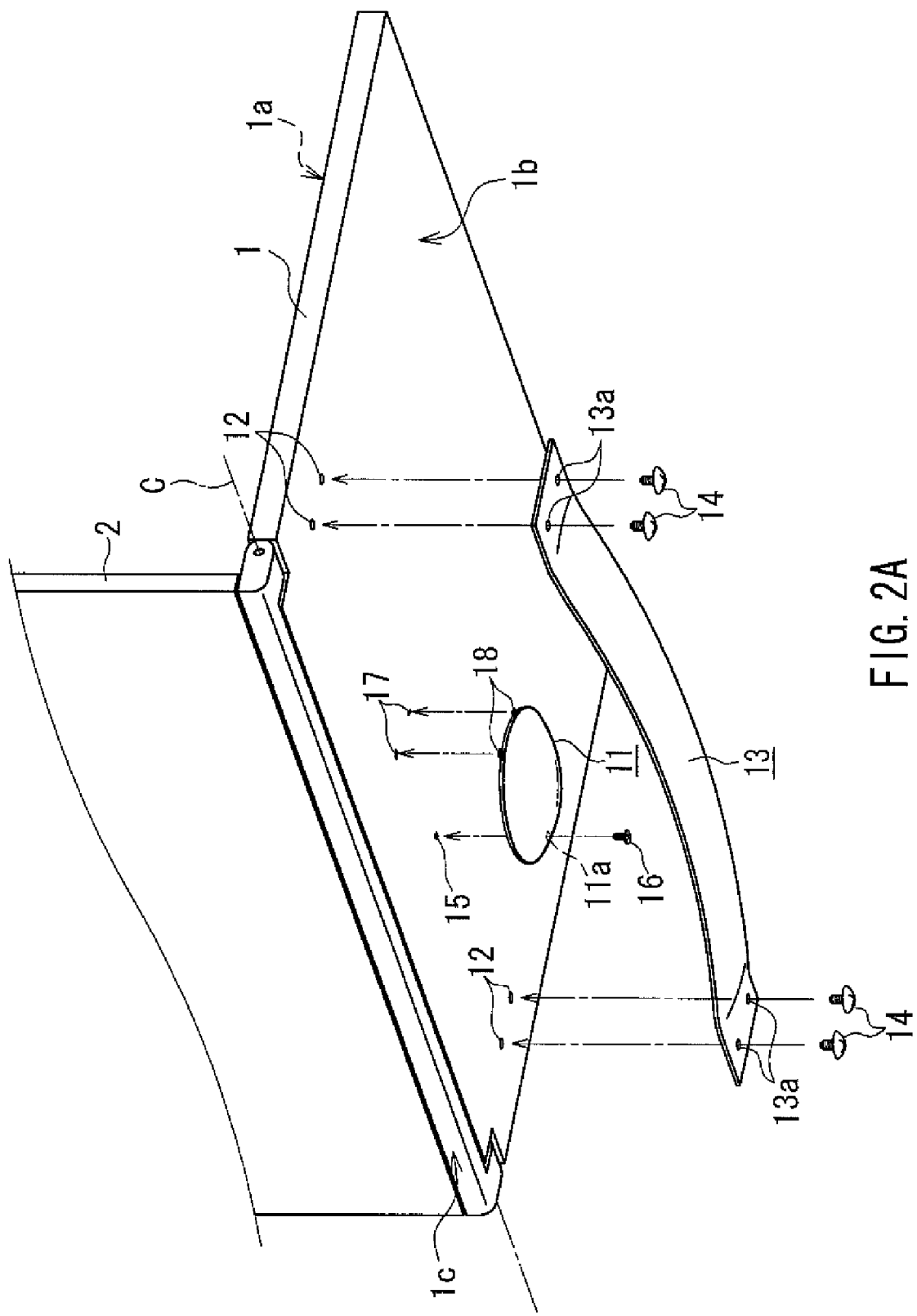
FIG. 2A is an exploded perspective view of the notebook PC, a protruding member, and a grip belt.
Figure 2B:
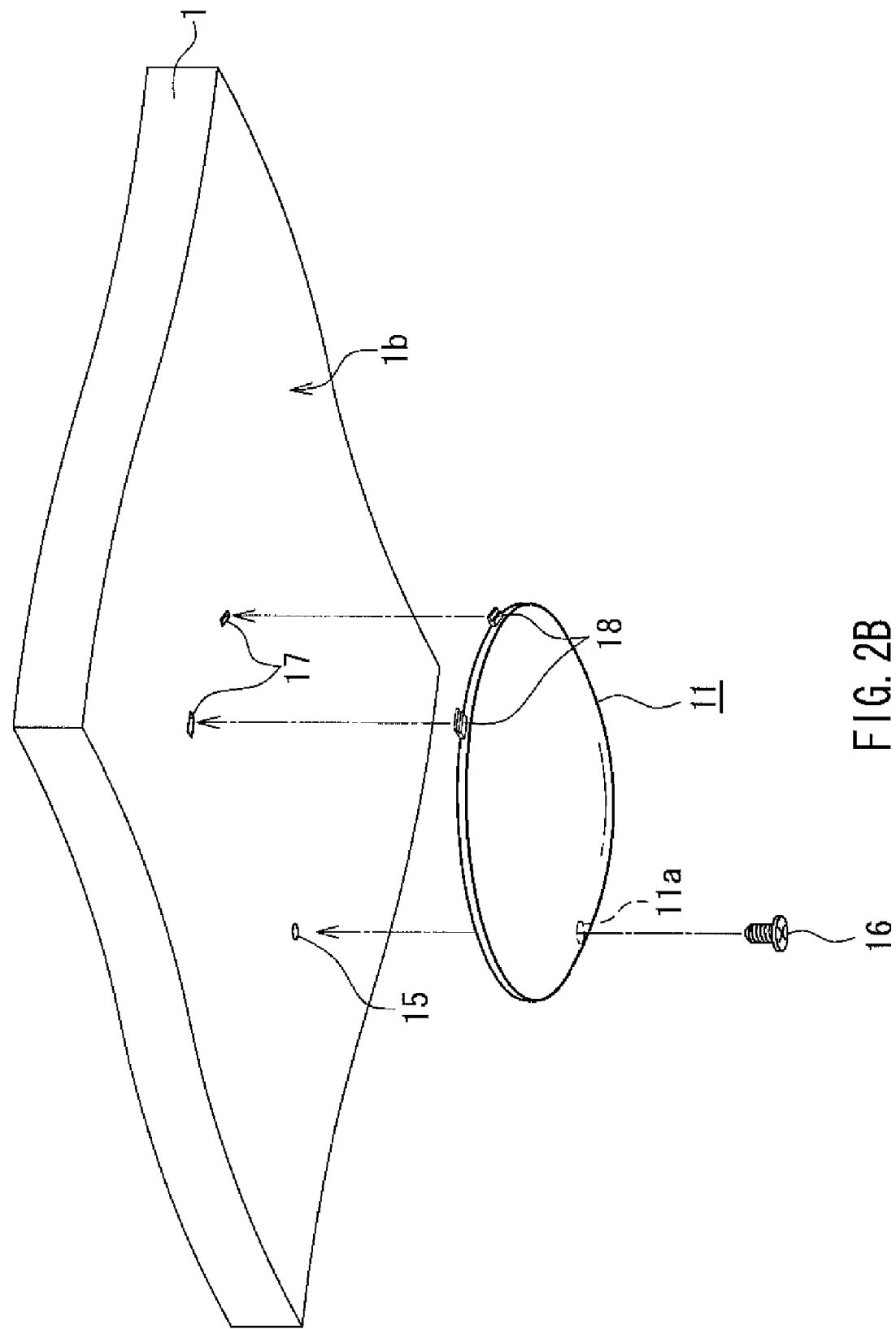
FIG. 2B is an enlarged view of the vicinity of the protruding member shown in FIG. 2A.

FIG. 2A is an exploded perspective view of the notebook PC, a protruding member 11, and a grip belt 13. FIG. 2B is an enlarged perspective view of the vicinity of the protruding member 11 shown in FIG. 2A. FIGS. 2A and 2B mainly show a bottom surface 1*b* side of the first housing 1 of the notebook PC. The bottom surface 1*b* of the first housing 1 corresponds to a surface on the backside of the top surface 1*a* of the first housing 1. As shown in FIGS. 2A and 2B, screw holes 12, a screw hole 15, and concave portions 17 are formed on the bottom surface 1*b* of the first housing 1.

The illustrated protruding member 11 has a circular planar shape. However, the planar shape of the protruding member 11 is not limited to a circular shape but may be an oval shape, a square shape, or the like. The protruding member 11 preferably has a shape that easily fits in the palm of a user's hand. As an example of the shape that easily fits in the palm of the user's hand, the protruding member 11 has a dome-shaped or hemispherical bulge. The protruding member 11 includes a hole portion 11*a* and lug portions 18 in the vicinity of a peripheral portion. The hole portion 11*a* and the lug portions 18 are provided at substantially diagonal positions in the protruding member 11. The protruding member 11 can be attached to the bottom surface 1b of the first housing 1 by means of a screw 16. Specifically, the two lug portions 18 formed on the protruding member 11 are engaged respectively with the concave portions 17, and the screw 16 is inserted through the hole portion 11a formed on the protruding member 11 and then screwed into the screw hole 15 formed on the bottom surface 1b. Consequently, the protruding member 11 can be attached to the bottom surface 1b. On the other hand, when the screw 16 is removed from the screw hole 15, and the lug portions 18 are disengaged from the concave portions 17, the protruding member 11 can be detached from the bottom surface 1b.

Although the protruding member 11 has a dome or hemispherical shape in the present embodiment, any other shape that fits in the palm of the user's hand, such as a part-cylindrical shape, is also applicable. Further, the protruding member 11, which is made of a hard resin in the present embodiment, may be made of a soft material that is capable of being deformed in accordance with the shape of the user's palm. Further, the protruding member 11 has an outer diameter R (see FIG. 3A) of 80 mm and a height H (see FIG. 3B) of 10 mm in the present embodiment. However, these dimensions are examples. Further, although the protruding member 11 can be attached to the first housing 1 by means of the screw 16 and the lug portions 18, it may be made easily attachable/detachable with respect to the bottom surface 1b of the first housing 1 by using a hook-and-loop fastener.

As shown in FIG. 2A, the protruding member 11 is attachable at a position on the bottom surface 1b that is located close to an opening/closing shaft C and at substantially the center of the opening/closing shaft C in an axial direction. By disposing the protruding member 11 at a position on the bottom surface 1b that is located close to the opening/closing shaft C, when the user holds the notebook PC with his/her hand inserted through the grip belt 13 (described later), a user's wrist or arm can be brought into contact with the bottom surface 1b, which allows the notebook PC to be held in a stable position.

Further, by attaching the protruding member 11 at substantially the center of the opening/closing shaft C in the axial direction, when the user holds the notebook PC with his/her hand inserted through the grip belt 13 (described later), a horizontal weight balance of the notebook PC with the hand as a center is achieved substantially, which allows the notebook PC to be held in a stable position.

Further, when the hand is inserted through the grip belt 13 so that the palm is located along a surface (spherical surface) of the protruding member 11, the hand is kept in a natural position. Herein, the hand in a "natural position" refers to a state where muscles of the hand and the vicinity thereof are not contracted significantly. Further, by inserting the hand through the grip belt 13 so that the palm is located along the surface (spherical surface) of the protruding member 11, the palm comes into surface contact with the protruding member 11, which reduces local concentration of pressure to be exerted on the palm by the protruding member 11. Consequently, it is possible to ease a feeling of pressure and tiredness for the user, allowing the user to hold the notebook PC with one hand for a long time.

The grip belt 13 is provided to prevent an accidental drop of the notebook PC while the user holds the notebook PC with one hand. The grip belt 13 preferably is made of a material that does not make the user uncomfortable and tired even when in prolonged contact with the user's hand (usually, the palm). It is preferable that at least a region of the grip belt 13 that comes into contact with the user's hand is made of fabric or rubber.

The grip belt 13 can be attached to the bottom surface 1b of the first housing 1. Specifically, screws 14 are inserted through hole portions 13a formed on the grip belt 13 and then screwed into the screw holes 12 formed on the bottom surface 1b, whereby the grip belt 13 can be attached to the bottom surface 1b. Further, by removing the screws 14 from the screw holes 12, the grip belt 13 can be detached from the first housing 1.

Figure 3A:
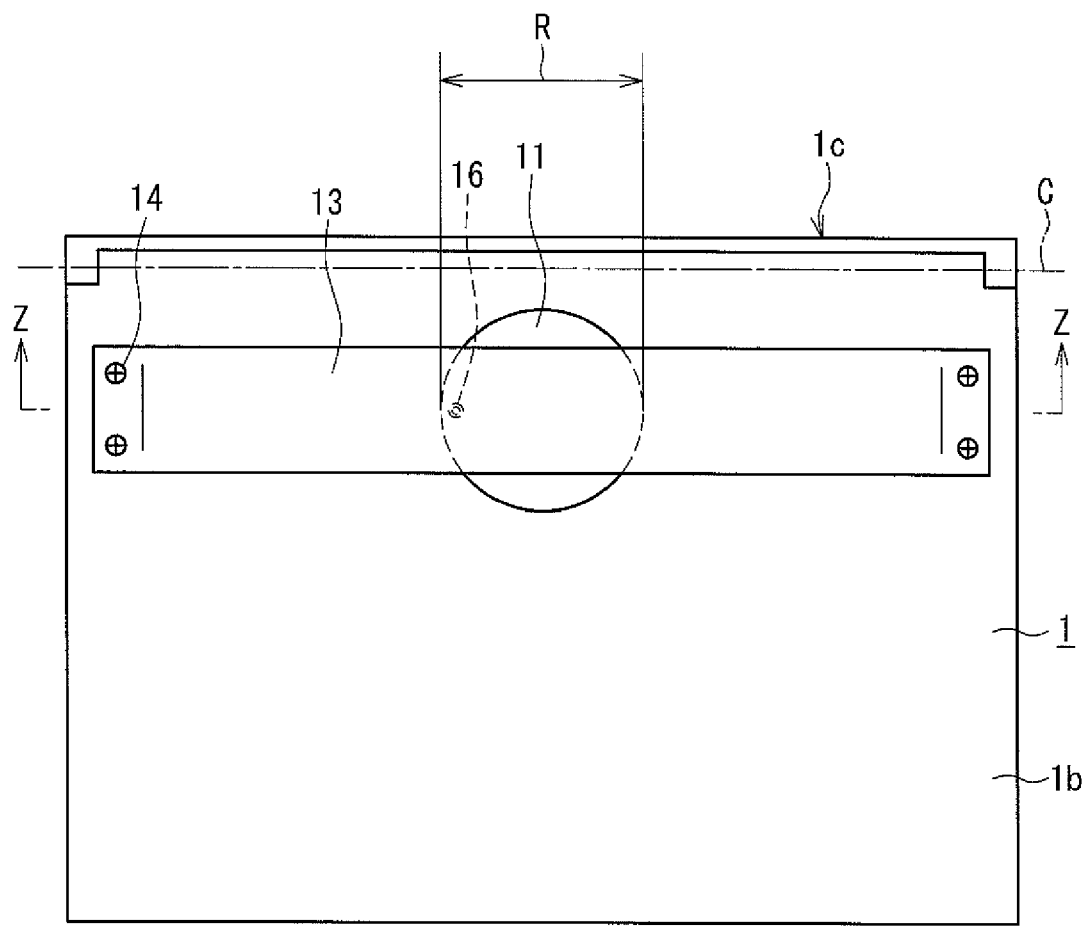
FIG. 3A is a plan view of a bottom surface of a first housing.
Figure 3B:
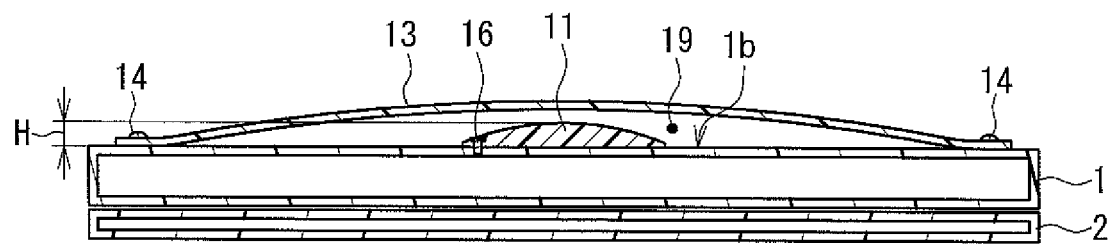
FIG. 3B is a cross-sectional view taken along a line Z-Z in FIG. 3A.
Figure 4:
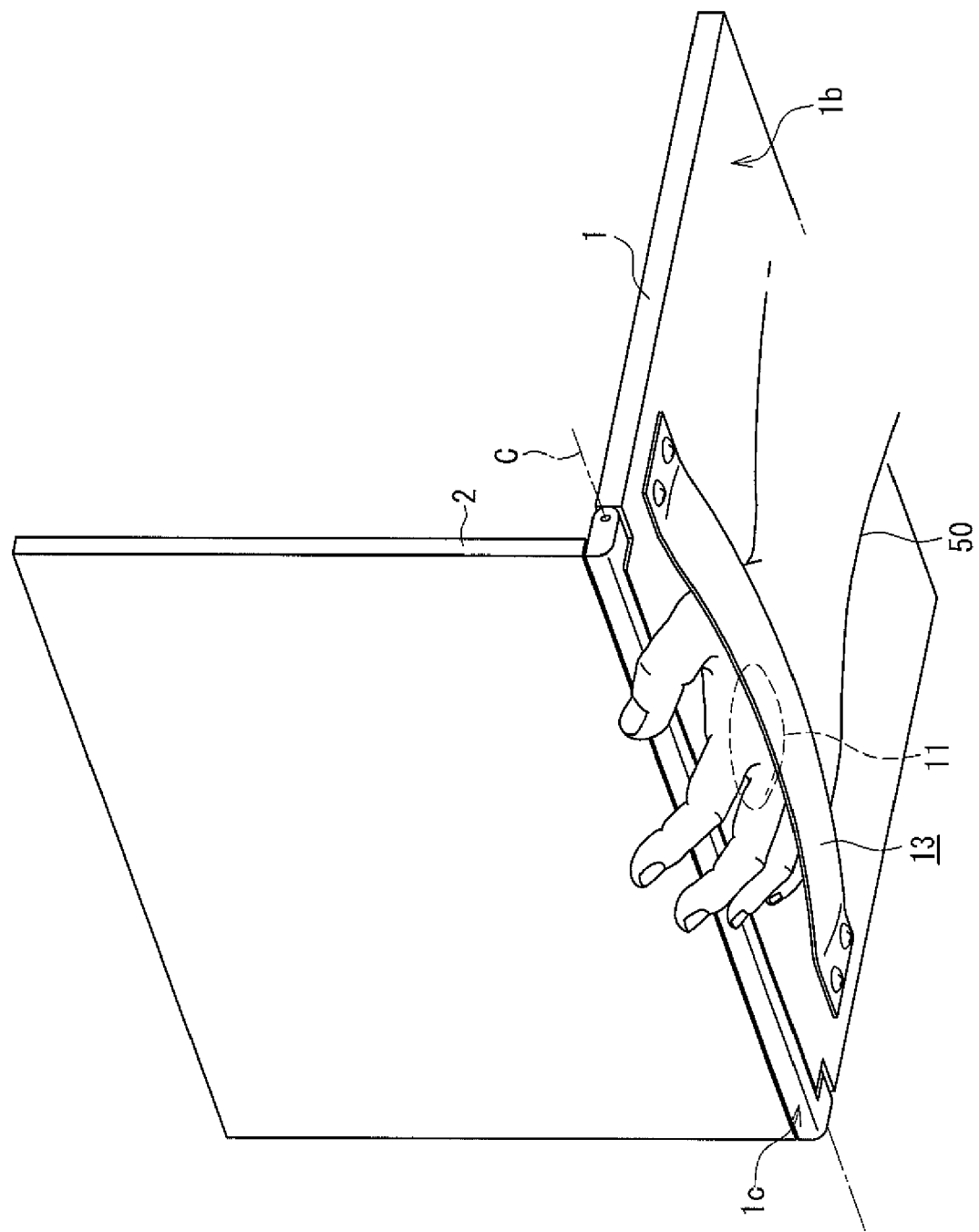
FIG. 4 is a plan view showing a state where the first housing is held by hand.

FIG. 3A is a plan view of the bottom surface 1b of the first housing 1 to which the grip belt 13 is attached. FIG. 3B is a cross-sectional view taken along a line Z-Z in FIG. 3A. FIG. 4 is a plan view showing a state where the user's hand is inserted through a space 19. In FIG. 3B, although the first housing 1 and the second housing 2 actually include built-in components such as an electronic circuit board, they are not shown for the sake of clarity.

As shown in FIGS. 3A and 3B, the grip belt 13 is provided so that a substantially central portion in a longitudinal direction thereof overlaps the protruding member 11. As shown in FIG. 3B, between the bottom surface 1b and the protruding member 11, the grip belt 13 has the space 19 that at least allows the user to insert or locate his/her hand therethrough.

As shown in FIG. 4, the user can hold the notebook PC with one hand by inserting his/her hand through the space 19. Specifically, as shown in FIG. 4, a left hand 50 is inserted through the space 19 (see FIG. 3B) so that the back of the left hand 50 is opposed to the grip belt 13 and the palm of the left hand 50 is opposed to the protruding member 11. Since the protruding member 11 is provided in the vicinity of the opening/closing shaft C on the bottom surface 1b of the first housing 1, when the left hand 50 is inserted through the space 19 (see FIG. 3B), the first to fourth fingers, for example, of the left hand 50 may partially protrude from the plane of the bottom surface 1b to a back surface 1c side (herein, the back surface 1c corresponds to a surface that is located closest to the opening/closing shaft C among four adjacent surfaces provided around the bottom surface 1b of the first housing 1). The fingers that protrude from the plane of the bottom surface 1b to the back surface 1c side may be bent at their joints so as to come into contact with the back surface 1c. For example, when each of the first to fourth fingers is bent at a first joint, then a distal knuckle of each of the first to fourth fingers can come into contact with the back surface 1c. Consequently, the distal knuckle of each of the first to fourth fingers of the left hand 50 comes into contact with the back surface 1c, while a proximal knuckle and a middle knuckle of each of the first to fourth fingers (only the proximal knuckle for the first finger) are in contact with the bottom surface 1b. The palm of the left hand 50 is in contact with the protruding member 11. In this manner, the user can hold the two surfaces (i.e., the bottom surface 1b and the back surface 1c) of the first housing 1 with the left hand 50, which allows the notebook PC to be held in a stable position.

Although the description has been given of the case where the notebook PC is held with the left hand 50 in the present embodiment, the notebook PC also can be held with a right hand (not shown). In the present embodiment, since the protruding member 11 is disposed at substantially the center of the opening/closing shaft C in the axial direction as shown in FIG. 3A, the notebook PC can be held in a stable position even with the right hand.

2. Effect of Embodiment Etc.

According to the present embodiment, the protruding member 11 is provided on the bottom surface 1b of the first housing 1. Thus, when the user holds the notebook PC with one hand, the palm is brought into contact with the protruding member 11, whereby the hand is less likely to shift relative to the first housing 1. Consequently, the notebook PC can be held in a stable position.

In particular, when the left hand 50 is brought into contact with the protruding member 11 so as to sandwich the protruding member 11 between a thenar and a hypothenar of the left hand 50, the position of the left hand 50 becomes less likely to shift relative to the protruding member 11. Consequently, the notebook PC can be held in a stable position.

Further, the protruding member 11 is disposed at a position on the bottom surface 1b that is located close to the opening/closing shaft C. Thus, when the user holds the notebook PC with his/her hand inserted through the grip belt 13 (described later), the user's wrist or arm comes into contact with the bottom surface 1b, which allows the notebook PC to be held in a stable position. Further, the protruding member 11 is attached at substantially the center of the opening/closing shaft C in the axial direction. Thus, when the user holds the notebook PC with his/her hand inserted through the grip belt 13 (described later), a horizontal weight balance of the notebook PC with the hand as a center is achieved substantially, which allows the notebook PC to be held in a stable position.

Further, the protruding member 11 is attachable/detachable with respect to the first housing 1. Thus, it is also possible to manage a use status where the protruding member 11 is unnecessary (such as a status where the notebook PC is placed and used on a desk). For example, if the protruding member is integrated into the first housing and has a height greater than those of other protrusions (such as a rubber foot) provided on the bottom surface of the first housing, the notebook PC will become unstable when placed on a planar surface such as a desk surface. To avoid this, the protruding member 11 is made attachable/detachable with respect to the first housing 1 in the present embodiment. Thus, by removing the protruding member 11 from the first housing 1, it is possible to make the bottom surface 1b of the first housing 1 substantially flat. Consequently, the notebook PC can be made stable even on a planar surface such as a desk surface.

Figure 5A:
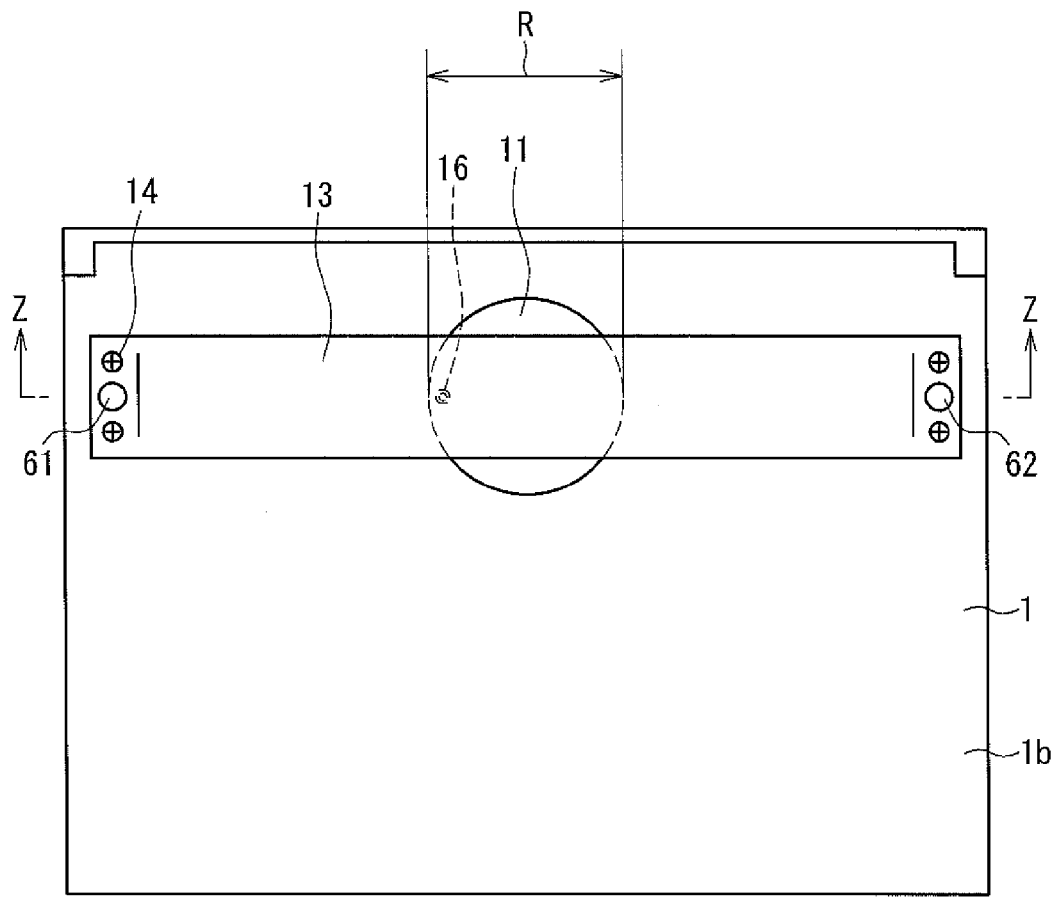
FIG. 5A is a plan view of main portions showing a modified example of the notebook PC.
Figure 5B:
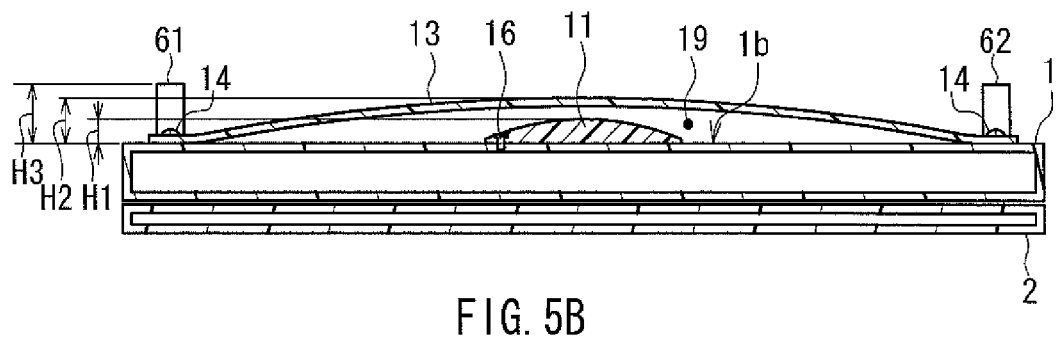
FIG. 5B is a cross-sectional view taken along a line Z-Z in FIG. 5A.

FIG. 5A is a plan view of the first housing 1 provided with rubber feet. FIG. 5B is a cross-sectional view taken along a line Z-Z in FIG. 5A. In the case where the notebook PC cannot be placed in a stable position on a planar surface such as a desk surface due to the provision of the protruding member 11, it is preferable to provide rubber feet 61 and 62, each having a height H3 that is not less than a height H1 of the protruding member 11 (or a height H2 of the grip belt 13), in the vicinity of the hole portions 13a on the grip belt 13 as shown in FIGS. 5A and 5B. Consequently, the notebook PC can be placed in a stable position on a planar surface such as a desk surface even with the protruding member 11 and the grip belt 13 attached to the first housing 1.

The rubber feet 61 and 62 provided on the grip belt 13 may cause the first housing 1 to be elevated relative to the desk surface. In such a case, an inclined surface may be provided to a portion of each of the pair of rubber feet 61 and 62 that comes into contact with the desk surface so that the first housing 1 is lowered on the pointing device 6 side as compared with the opening/closing shaft C side. Consequently, the operability of the notebook PC placed on the desk surface can be improved.

When the rubber feet are formed integrally with the grip belt 13 so as to overlap the hole portions 13a, the screws 14 can be embedded at portions of the rubber feet. With this configuration, the stability of the notebook PC placed on a plane can be improved further. Further, this configuration allows the rubber feet to serve to house and protect the screws 14.

Further, since the protruding member 11 is attachable/detachable with respect to the first housing 1, it is possible to provide greater flexibility in setting the dimensions of members to be provided on the bottom surface 1b of the first housing 1. For example, if the protruding member 11 is integrated into the first housing 1 and has the height H (see FIG. 3B) greater than those of other protrusions (such as a rubber foot) on the bottom surface 1b of the first housing 1, the height H (see FIG. 3B) of the protruding member 11 cannot be so great considering that the notebook PC is placed on a planar surface such as a desk surface. On the other hand, if the height H (see FIG. 3B) of the protruding member 11 is small, the grip property with respect to the user's palm will be reduced, which may make it impossible to hold the notebook PC in a stable position. If the height H (see FIG. 3B) of the protruding member 11 is great, the height H3 of each of the rubber feet 61 and 62 will be made greater than the height H1 of the protruding member 11 as shown in FIG. 5B. However, if the height H3 of each of the rubber feet 61 and 62 is too great, it may be difficult to put the notebook PC in and out of a bag or the like because the rubber foot 61 or 62 will be likely to be caught by a seam or the like of the bag. To avoid these issues, the protruding member 11 is made attachable/detachable with respect to the first housing 1 in the present embodiment. Thus, it is possible to provide the rubber feet 61 and 62 whose height is smaller than the height H1 of the protruding member 11. When the height H3 of each of the rubber feet 61 and 62 is small, there is an advantage that the notebook PC can be put in and out of a bag or the like easily because the rubber foot 61 or 62 is less likely to be caught by a seam or the like of the bag. In this manner, in the present embodiment, it is possible to set the dimensions of the members (such as a rubber foot) to be provided on the bottom surface 1b of the first housing 1 without considering the height of the protruding member 11. Further, in the present embodiment, the height of the protruding member 11 can be determined with no consideration given to the height of each of the rubber feet 61 and 62 and the like. Thus, it is possible to attach the protruding member 11 whose height is greater than those of the rubber feet 61 and 62 in consideration of the grip property.

Further, by removing the protruding member 11 and the grip belt 13 from the first housing 1, the notebook PC has less protrusions on its surface and hence can be put in and out of a bag or the like easily because it is less likely to be caught by a seam or the like of the bag.

Further, by removing the protruding member 11 and the grip belt 13 from the first housing 1, the total thickness of the notebook PC can be made smaller. Thus, the notebook PC does not take up much space when being put in a bag or the like and hence can achieve improved portability.

Further, since the protruding member 11 is attachable/detachable with respect to the first housing 1, the notebook PC can be manufactured easily. In general, the notebook PC is manufactured using the following procedures: assembling the first housing 1 and the second housing 2 individually; and combining the first housing 1 with the second housing 2 using the hinge mechanism 3. For example, if the protruding member is integrated into the first housing and has a height greater than those of other protrusions (such as a rubber foot) on the bottom surface of the first housing, it will be difficult to stack the first housings in a stable position during the manufacture of the notebook PCs, which results in the necessity of a dedicated jig. In contrast, when the protruding member 11 is attachable/detachable with respect to the first housing 1 as in the present embodiment, by performing a step of attaching the protruding member 11 to the first housing 1 at the end of the notebook PC manufacturing process or in the vicinity thereof, the first housings can be stacked in a stable position in steps other than the step of attaching the protruding member 11. Consequently, no dedicated jig as described above is required, resulting in reduced manufacturing cost.

Further, since the protruding member 11 is attachable/detachable with respect to the first housing 1, it is possible to remove the protruding member 11 from the first housing 1 and wash the same or to replace the old protruding member 11 with a new one. Further, since the protruding member 11 is attachable/detachable with respect to the first housing 1, the protruding member 11 can be attached and detached with respect to the first housing 1 according to the user's preference. The protruding member 11 may be attached/detached with respect to the first housing 1 by the user freely or attached by a notebook PC maker according to the user's preference.

Further, the protruding member 11 and the grip belt 3 can be made attachable/detachable appropriately according to the user's preference. For example, the rubber foot can be inserted into the screw holes 12 after the grip belt 13 is removed from the first housing 1. Further, a member for sealing a concave portion 20 can be attached to the first housing 1, thereby sealing the screw hole 15 and the concave portions 17. With these configurations, it is possible to prevent a decrease in the water resistance and dust resistance of the first housing 1 when the protruding member 11 and the grip belt 13 are absent.

Although the protruding member 11 has a circular planar shape in the present embodiment, the planar shape is not limited to a circular shape as long as it fits in the palm of the user's hand.

Although the screw hole 15 and the concave portions 17 are provided on the bottom surface 1b of the first housing 1 in the present embodiment, a concave portion for locating the protruding member 11 further may be provided.

Figure 6A:
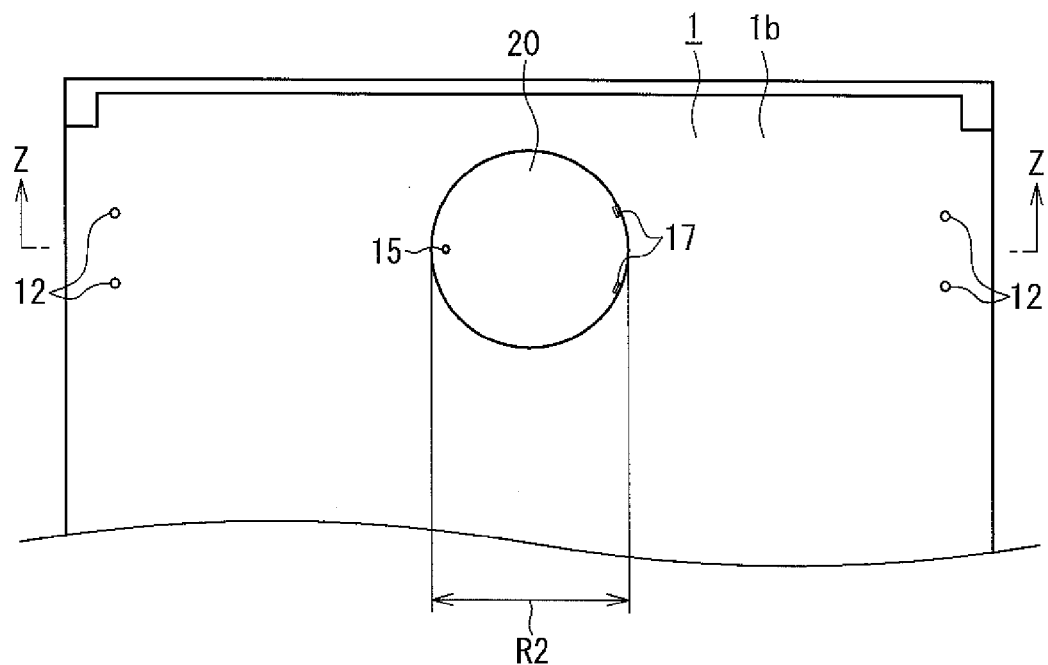
FIG. 6A is a plan view of main portions showing a modified example of the notebook PC.
Figure 6B:
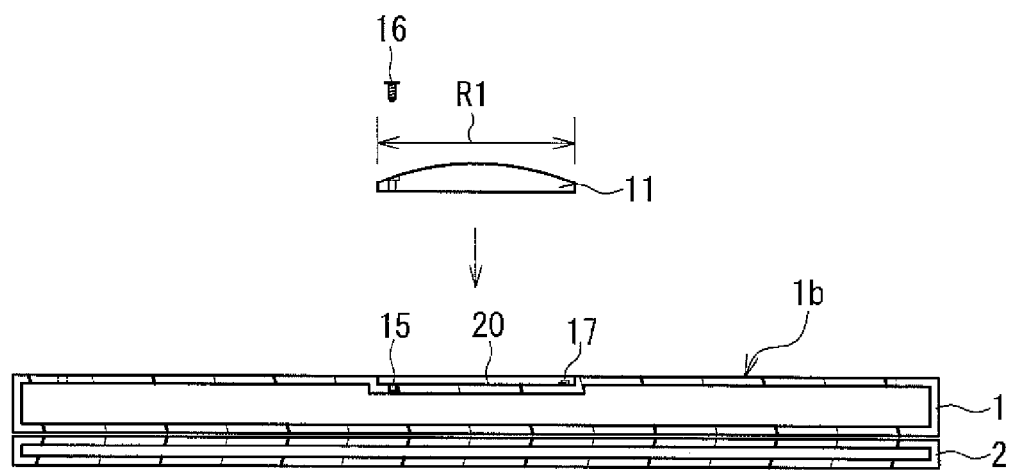
FIG. 6B is a cross-sectional view taken along a line Z-Z in FIG. 6A.

FIG. 6A is a plan view of main portions of the first housing provided with a concave portion for locating the protruding member 11. FIG. 6B is a cross-sectional view taken along a line Z-Z in FIG. 6A. The concave portion 20 shown in FIGS. 6A and 6B is formed at a position where the protruding member 11 is attached. The concave portion 20 has an inner diameter R2 that is slightly larger than the outer diameter R1 of the protruding member 11, so that the protruding member 11 can be housed in the concave portion 20. The screw hole 15 and the concave portions 17 are formed in the concave portion 20.

Although the protruding member 11 is attached to the first housing 1 by means of the screw 16 screwed into the screw hole 15 and the lug portions engaged with the concave portions 17 in the present embodiment, any other attachment method also may be adopted. For example, hook-and-loop fasteners may be provided respectively on the protruding member 11 and the bottom surface 1b of the first housing 1, so that the protruding member 11 can be attached to the bottom surface 1b by joining the hook-and-loop fasteners. Alternatively, a male screw portion may be formed on a peripheral surface of the protruding member 11, while a female screw portion may be formed on an inner surface of the concave portion 20 (see FIGS. 6A and 6B) in the first housing 1, so that the protruding member 11 can be screwed into the concave portion 20. Further alternatively, an attachment/detachment method as shown in FIGS. 7A to 7C is also available.

Figure 7A:
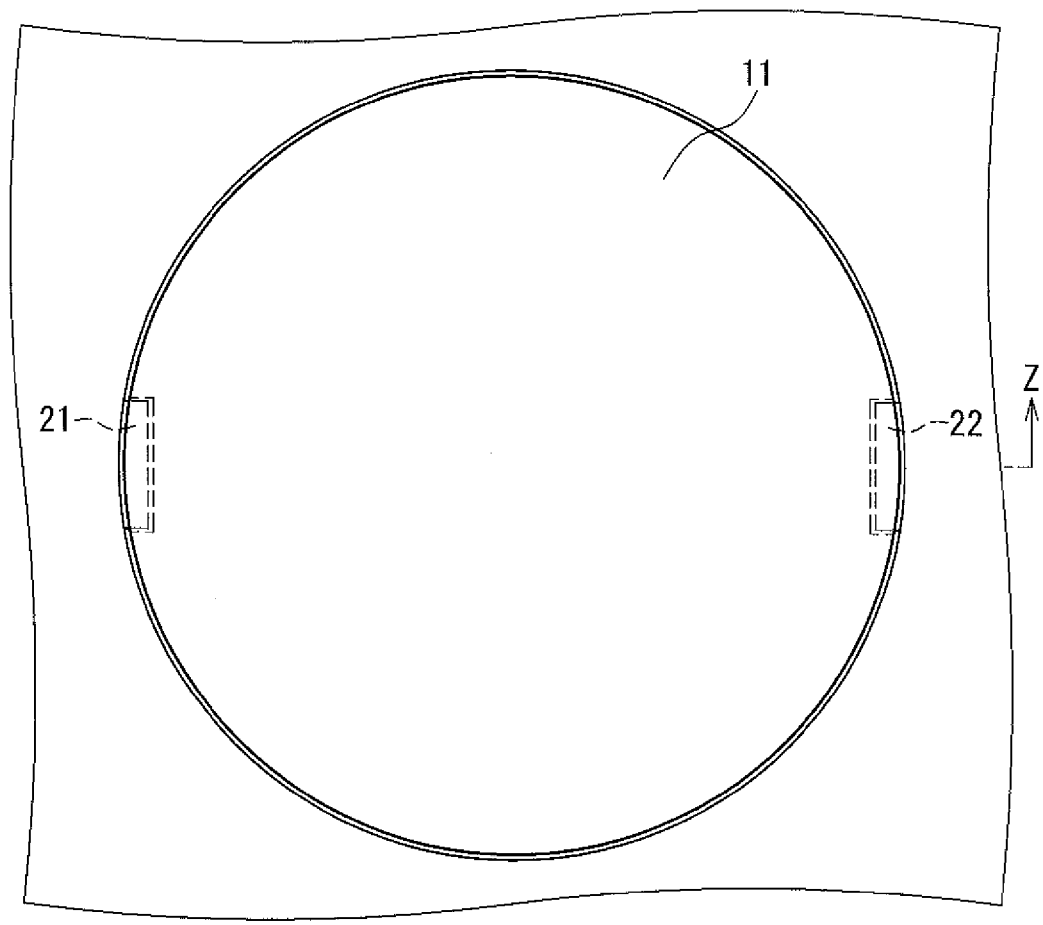
FIG. 7A is a plan view showing a modified example of a configuration for attaching/detaching the protruding member with respect to the first housing.

FIG. 7A is a plan view showing a modified example of the method for attaching the protruding member 11 to the first housing 1. FIG. 7B is a cross-sectional view taken along a line Z-Z in FIG. 7A. FIG. 7C is a cross sectional view of main portions in the vicinity of an engagement member 22 shown in FIG. 7B. As shown in FIGS. 7A to 7C, the protruding member 11 includes a pair of engagement members 21 and 22 on a peripheral surface. The engagement member 21 is biased in a direction indicated by an arrow D by a biasing means (not shown) such as a spring. The engagement member 21 can be displaced in a direction indicated by an arrow F when being subjected to a pressing force in the same direction. The engagement member 21 is provided with a concave portion (not shown) that can be fitted with a convex portion 20a formed on the inner surface of the concave portion 20. The engagement member 21 includes an operation portion (not shown) that protrudes from the protruding member 11 when the engagement member 21 is biased in the direction indicated by the arrow D by the biasing means. The engagement member 22 is biased in a direction indicated by an arrow E by a biasing means (not shown) such as a spring. The engagement member 22 is provided with a concave portion 22a that can be fitted with the convex portion 20a as shown in FIG. 7C. As shown in FIG. 7C, the engagement member 22 includes an operation portion 22b that protrudes from the protruding member 11 when the engagement member 22 is biased in the direction indicated by the arrow E by the biasing means. The engagement member 22 can be displaced in a direction indicated by an arrow G when being subjected to a pressing force in the same direction. In the configuration shown in FIGS. 7A to 7C, when the user presses the operation portion (that has the same configuration as that of the operation portion 22b shown in FIG. 7C and thus is not shown) in the direction indicated by the arrow F and presses the operation portion 22b in the direction indicated by the arrow G, the engagement member 21 is displaced in the direction indicated by the arrow F, and the engagement member 22 is displaced in the direction indicated by the arrow G. Consequently, the concave portion 21a (that has the same configuration as that of the concave portion 22a shown in FIG. 7C and thus is not shown) and the concave portion 22a are separated from the convex portion 20a, so that the protruding member 11 can be removed in a direction indicated by an arrow L.

On the other hand, when the protruding member 11 is attached to the first housing 1, the protruding member 11 separated from the first housing 1 (the separated state is not shown) is displaced in a direction indicated by an arrow M and inserted into the concave portion 20. When the protruding member 11 is inserted into the concave portion 20 until the engagement members 21 and 22 come into contact with the convex portion 20a, and is displaced further in the direction indicated by the arrow M, the engagement members 21 and 22 are guided to an outer surface of the convex portion 20a and displaced respectively in the directions indicated by the arrows F and G. When the protruding member 11 is inserted into the concave portion 20 until the concave portion of the engagement member 21 and the concave portion 22a of the engagement member 22 can be fitted with the convex portion 20a, the engagement member 21 is displaced in the direction indicated by the arrow D by the biasing means, and the engagement member 22 is displaced in the direction indicated by the arrow E by the biasing means. Consequently, the protruding member 11 can be attached to the first housing 1.

Figure 7B:
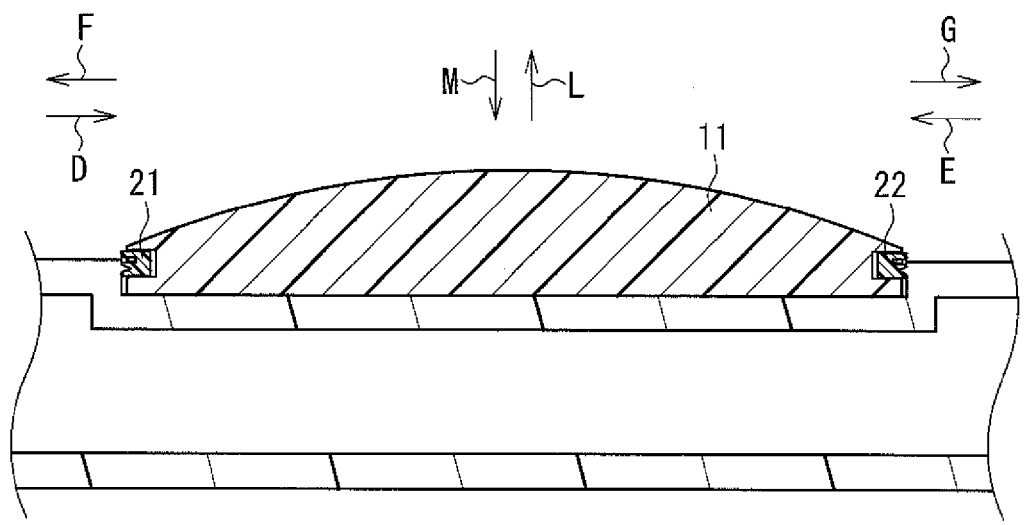
FIG. 7B is a cross-sectional view taken along a line Z-Z in FIG. 7A.
Figure 7C:
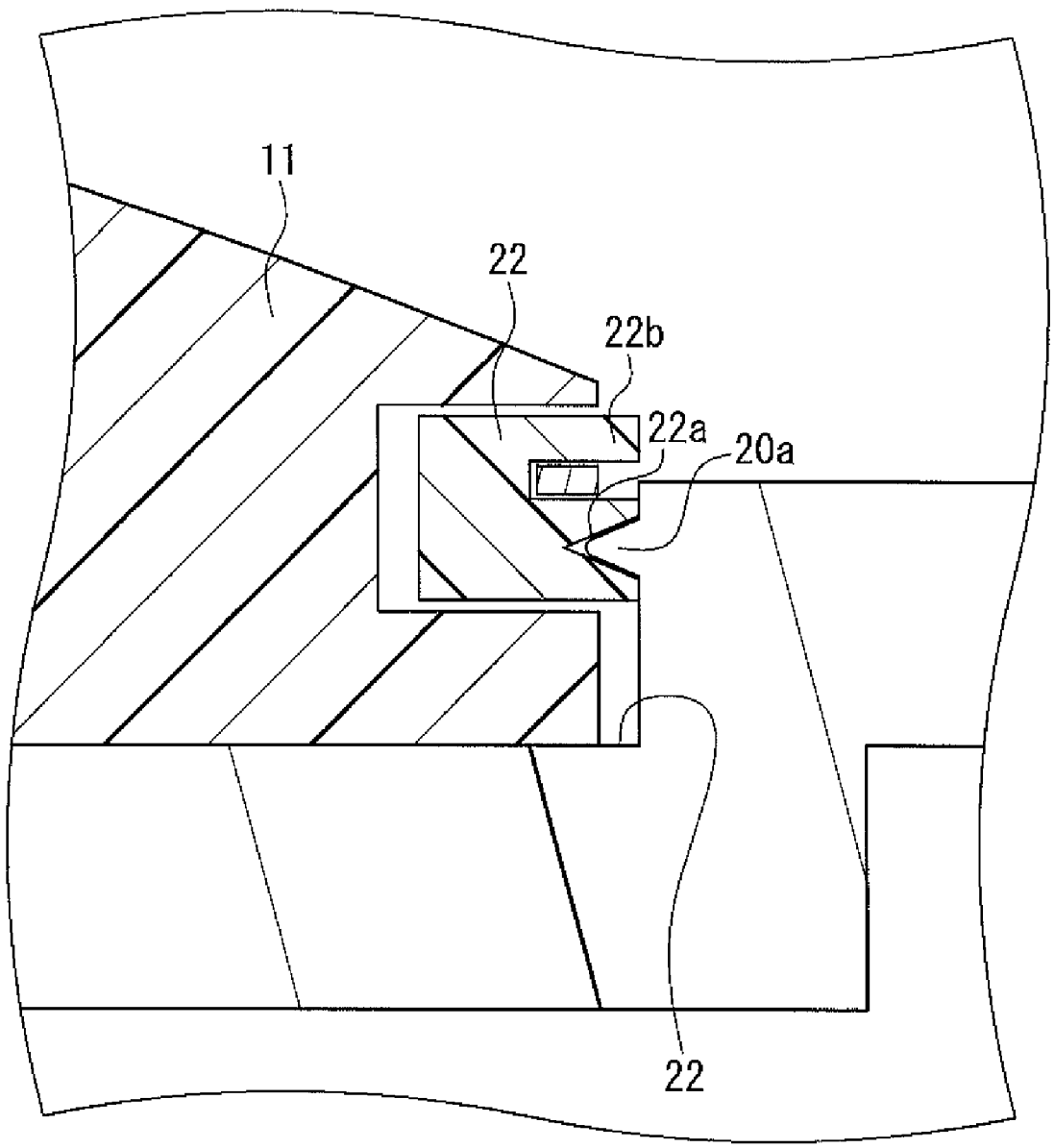
FIG. 7C is a cross sectional view of main portions in the vicinity of an engagement member 22 shown in FIG. 7B.

With the configuration as shown in FIGS. 7A to 7C, the protruding member 11 can be attached/detached with respect to the first housing 1 easily. It is also possible that a concave portion is provided on the inner surface of the concave portion 20, while convex portions are provided on the engagement members 21 and 22. Since the convex portion 20a of the concave portion 20 is formed over the entire periphery of the concave portion 20 in a circumferential direction, the protruding member 11 can be attached to the first housing 1 easily because the position of the protruding member 11 in the circumferential direction is not limited.

The protruding member 11 may be attached to the first housing 1 rotatably. Alternatively, the protruding member 11 may be attached to the first housing 1 rotatably and removably.

Figure 8A:
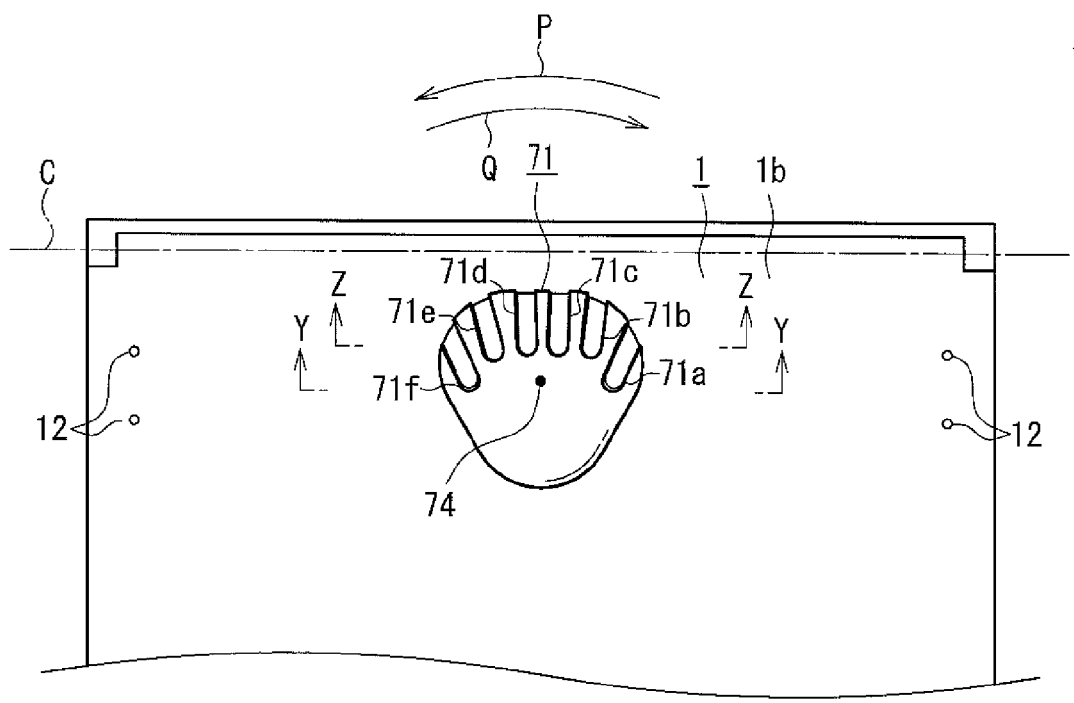
FIGS. 8A, 8D, and 8E are plan views of main portions showing a modified example of the protruding member.
Figure 8B:
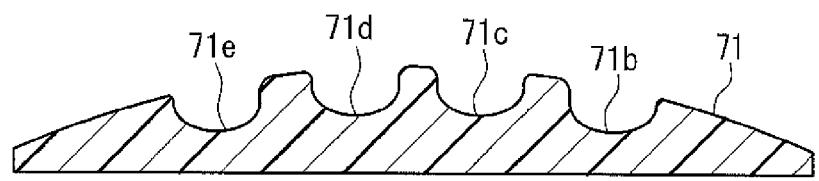
FIG. 8B is a cross-sectional view taken along a line Y-Y in FIG. 8A.
Figure 8C:
FIG. 8C is a cross-sectional view taken along a line Z-Z in FIG. 8A.

FIG. 8A is a plan view of main portions showing a modified example of the protruding member. FIG. 8B is a cross-sectional view taken along a line Y-Y in FIG. 8A. FIG. 8C is a cross-sectional view taken along a line Z-Z in FIG. 8A. As shown in FIG. 8A, a protruding member 71 has a substantially triangular planar shape and a smooth convex three-dimensional shape so as to fit in the palm of the user's hand. The protruding member 71 may be attached to the first housing 1 by means of a screw 16 or may be made attachable/detachable with respect to the first housing 1 by using the attachment structure as shown in FIGS. 7A and 7B. The protruding member 71 has a first concave portion 71a, a second concave portion 71b, a third concave portion 71c, a fourth concave portion 71d, a fifth concave portion 71e, and a sixth concave portion 71f that are formed close to the opening/closing shaft C.

The first concave portion 71a is formed so as to fit the first finger of the left hand when the user holds the protruding member 71 with the left hand. The second concave portion 71b is formed so as to fit the second finger of the left hand when the user holds the protruding member 71 with the left hand and to fit the fifth finger of the right hand when the user holds the protruding member 71 with the right hand. The third concave portion 71c is formed so as to fit the third finger of the left hand when the user holds the protruding member 71 with the left hand and to fit the fourth finger of the right hand when the user holds the protruding member 71 with the right hand. The fourth concave portion 71d is formed so as to fit the fourth finger of the left hand when the user holds the protruding member 71 with the left hand and to fit the third finger of the right hand when the user holds the protruding member 71 with the right hand. The fifth concave portion 71e is formed so as to fit the fifth finger of the left hand when the user holds the protruding member 71 with the left hand and to fit the second finger of the right hand when the user holds the protruding member 71 with the right hand. The sixth concave portion 71f is formed so as to fit the first finger of the right hand when the user holds the protruding member 71 with the right hand. Thus, the user can hold the protruding member 71 with either the left or right hand. As shown in FIG. 8B, each of the concave portions 71a to 71f has a bottom having an arc-shaped cross section so that the finger of the user easily fits therein. As shown in FIG. 8C, the protruding member 71 is bulged substantially at its center so as to fit in the palm when the user places his/her hand between the grip belt (not shown) and the protruding member 71.

It is not necessarily required to provide the first concave portion 71a, the second concave portion 71b, the third concave portion 71c, the fourth concave portion 71d, the fifth concave portion 71e, and the sixth concave portion 71f. Without these concave portions, the direction (rotation angle) of the protruding member 71 can be known visually from its shape as shown in FIG. 8A.

Further, the first concave portion 71a, the second concave portion 71b, the third concave portion 71c, the fourth concave portion 71d, the fifth concave portion 71e, and the sixth concave portion 71f may be provided on the hemispherical protruding member 11 shown in FIG. 3A, for example. When the protruding member 11 includes the first concave portion 71a, the second concave portion 71b, the third concave portion 71c, the fourth concave portion 71d, the fifth concave portion 71e, and the sixth concave portion 71f, the direction (rotation angle) of the protruding member 11 can be known visually. In particular, when the protruding member 11 is attached to the first housing 1 rotatably, it is preferable that the protruding member 11 includes these concave portions.

The user can hold the protruding member 71 in a position shown in FIG. 8A with the left or right hand. For example, when the user sets his/her left fingers in the first concave portion 71a, the second concave portion 71b, the third concave portion 71c, the fourth concave portion 71d, and the fifth concave portion 71e, respectively, the user can hold the protruding member 71 with the left hand easily. On the other hand, when the user sets his/her right fingers in the second concave portion 71b, the third concave portion 71c, the fourth concave portion 71d, the fifth concave portion 71e, and the sixth concave portion 71f, respectively, the user can hold the protruding member 71 with the right hand easily.

Figure 8D:
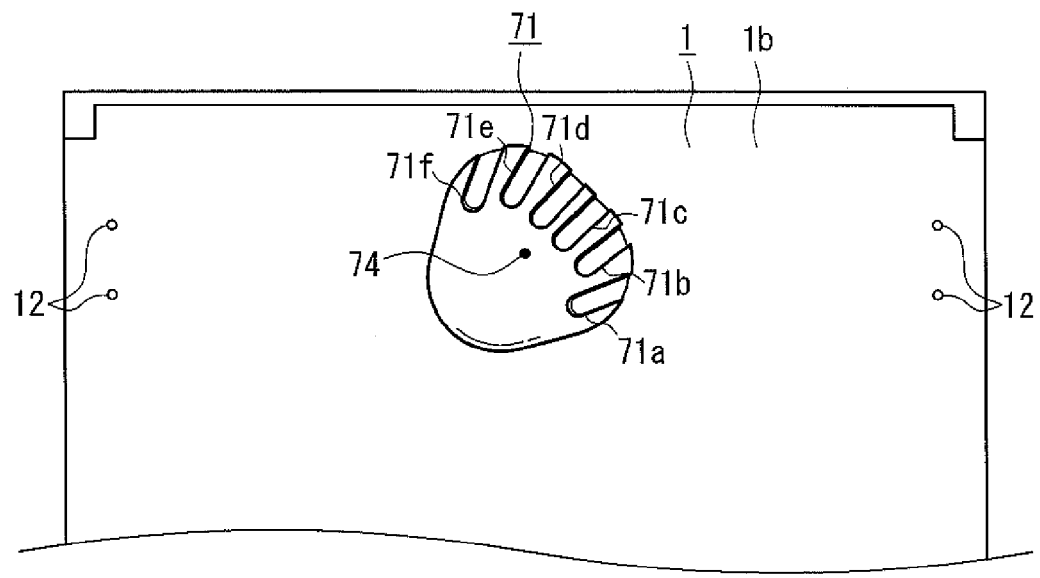
Figure 8E:
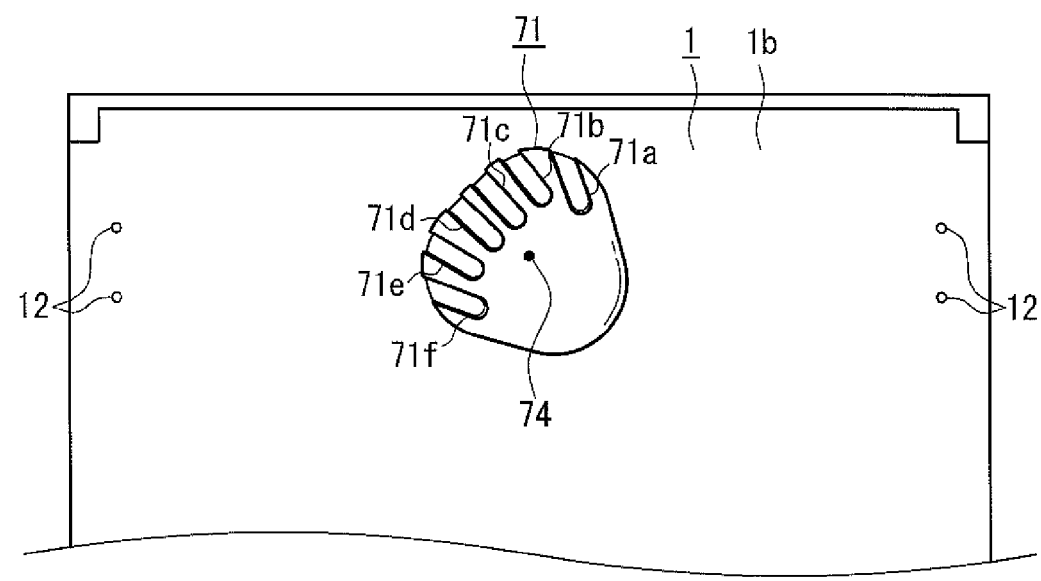

Although the protruding member 71 shown in FIGS. 8A to 8C is fixed to the first housing 1, it may be made rotatable in a direction indicated by an arrow P or Q about a center point 74. The protruding member 71 can be rotated from a position indicated by a solid line in FIG. 8A by about 45 degrees in the direction indicated by the arrow P (to a position 73 indicated by an alternate long and short dash line in FIG. 8E) and in the direction indicated by the arrow Q (to a position 72 indicated by an alternate long and two short dashes line in FIG. 8D). The rotation angle of the protruding member 71 is not limited to 45 degrees and preferably may be set at any angle in a range of 30 to 45 degrees so as to allow the user to hold the protruding member 71 with his/her hand or arm kept in a natural position. Further, the protruding member 71 may include a configuration that can locate the protruding member 71 at a predetermined rotation angle between the positions 72 and 73 shown in FIGS. 8D and 8E, respectively. The configuration that can locate the protruding member 71 may be the one shown in FIGS. 7A, 7B, and 7C, for example. Further, the protruding member 71 may include a configuration that can locate the protruding member 71 at the position shown in FIG. 8A. The direction (rotation angle) of the protruding member 71 can be known visually from its shape as shown in FIG. 8A.

Although the protruding member 71 shown in FIG. 8A includes the six concave portions, it may include only five concave portions. In this case, however, it is necessary to provide a left-handed protruding member and a right-handed protruding member. The left-handed protruding member includes the first concave portion 71a, the second concave portion 71b, the third concave portion 71c, the fourth concave portion 71d, and the fifth concave portion 71e, and the right-handed protruding member includes the second concave portion 71b, the third concave portion 71c, the fourth concave portion 71d, the fifth concave portion 71e, and the sixth concave portion 71f.

Figure 9A:
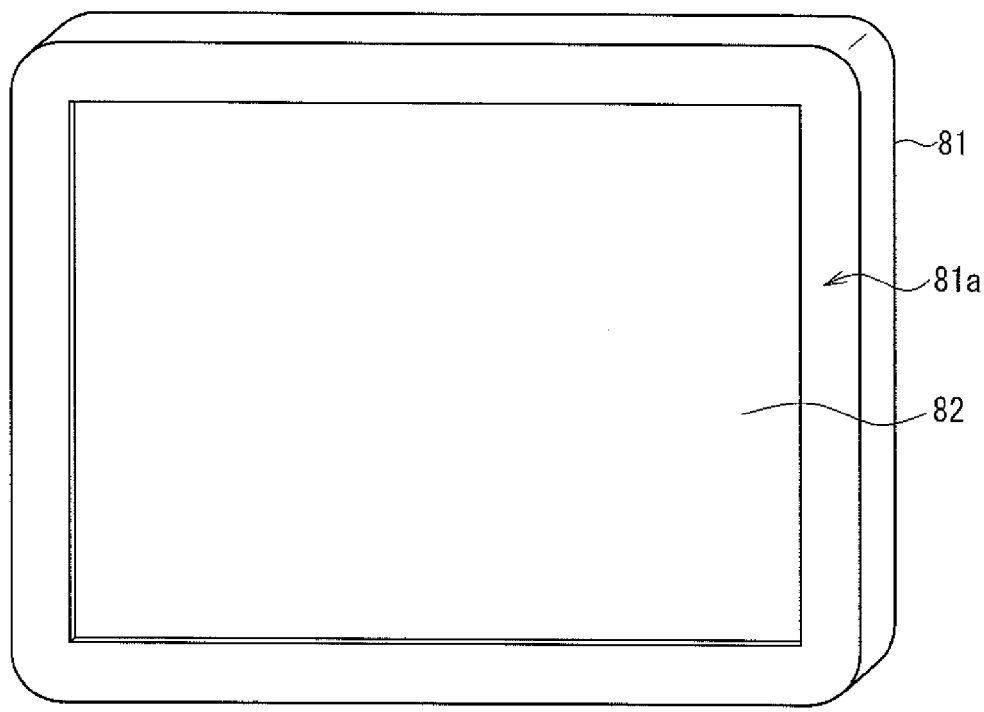
FIG. 9A is a perspective view showing a modified example of electronic equipment.
Figure 9B:
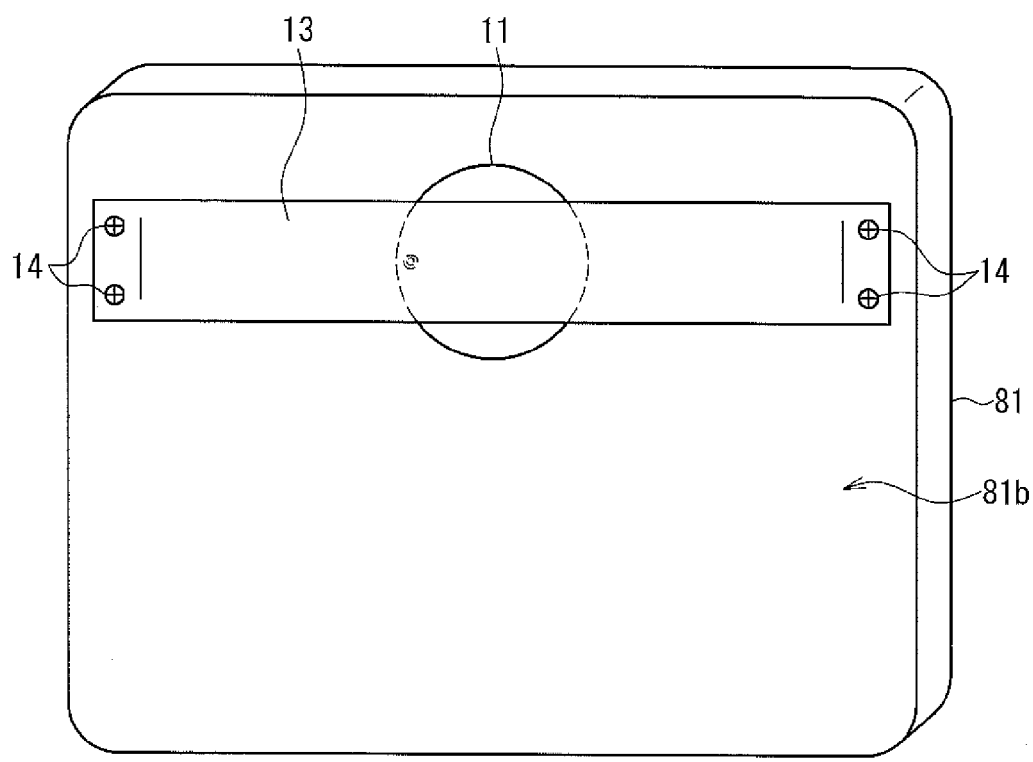
FIG. 9B is a perspective view showing the modified example of the electronic equipment.

FIGS. 9A and 9B are perspective views showing a modified example of electronic equipment. FIG. 9A mainly shows a front surface side of the electronic equipment. FIG. 9B mainly shows a back surface side of the electronic equipment. Electronic equipment (PC) 81 shown in FIGS. 9A and 9B is formed of a single housing unlike the notebook PC formed of the two housings as shown in FIG. 1, for example. The electronic equipment 81 includes a display panel 82, the protruding member 11, and the grip belt 13. As shown in FIG. 9A, the display panel 82 is provided on a front surface 81a of the electronic equipment 81. As shown in FIG. 9B, the protruding member 11 and the grip belt 13 are provided on a back surface 81b of the electronic equipment 81. Although the protruding member 11 has a substantially circular planar shape as in FIG. 5A, for example, any planar shape other than a circular shape is also applicable as shown in FIG. 8A, for example. Between the first housing 1 and the protruding member 11, the grip belt 13 has a space that allows the user to insert his/her hand therethrough.

Figure 10A:
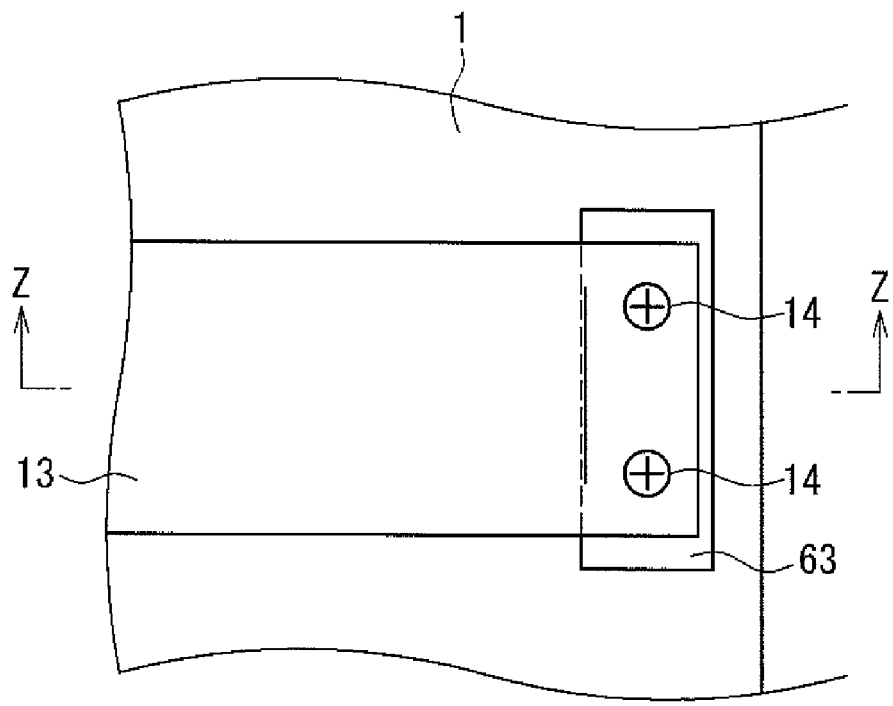
FIG. 10A is a plan view of main portions showing a modified example of a configuration for attaching the grip belt.
Figure 10B:
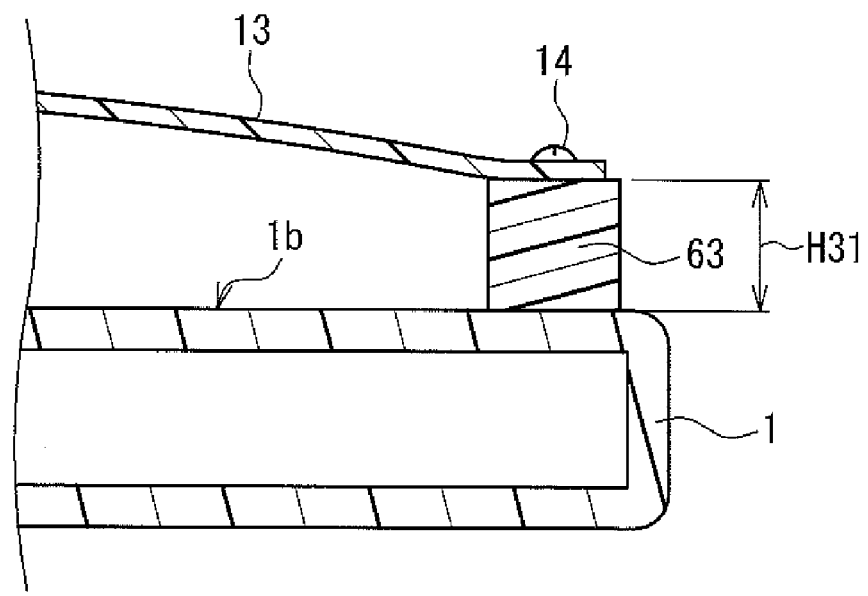
FIG. 10B is a cross-sectional view taken along a line Z-Z in FIG. 10A.

FIG. 10A is a plan view of main portions showing a modified example of the configuration for attaching the grip belt. FIG. 10B is a cross-sectional view taken along a line Z-Z in FIG. 10A. Although the grip belt 13 is fixed directly to the first housing 1 by means of the screws 14 in the present embodiment, a holding member 63 may be provided between the first housing 1 and the grip belt 13 as shown in FIGS. 10A and 10B. The holding member 63 allows a sufficient space to be formed between the first housing 1 and the grip belt 13. The holding member 63 is fixed to the first housing 1. The grip belt 13 is attached to the holding member 63 by means of the screws 14. The provision of the holding member 63 allows a larger space to be formed between the first housing 1 and the grip belt 13, thereby enabling a large-handed user, for example, to insert his/her hand between the first housing 1 and the grip belt 13.

The holding member 63 may be made attachable/detachable with respect to the first housing 1. By making the holding member 63 attachable/detachable with respect to the first housing 1, when the holding member 63 is detached from the first housing 1, the bottom surface 1b of the first housing 1 can be flat, so that the electronic equipment can be placed on a desk or the like in a stable position.

Figure 10C:
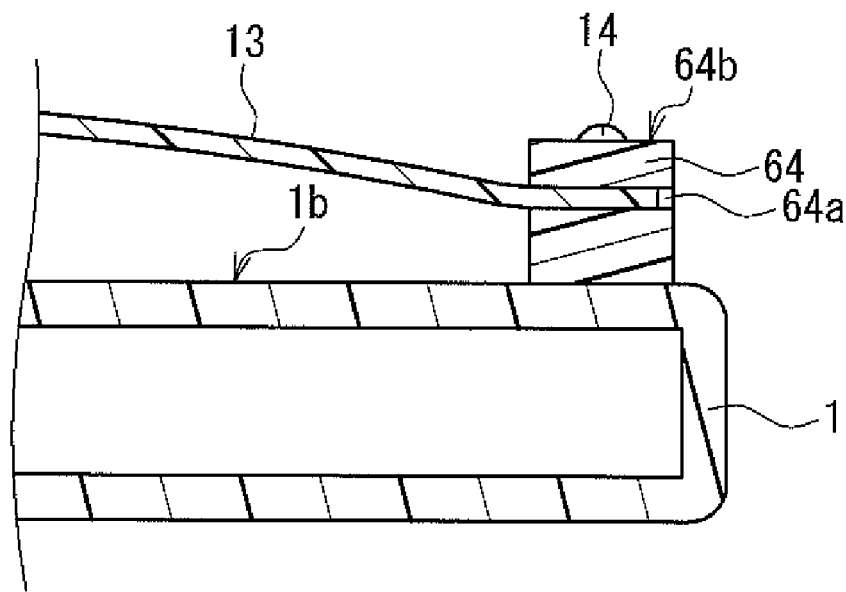
FIG. 10C is a cross-sectional view showing a modified example of the configuration for attaching the grip belt.

Alternatively, the holding member may be formed as shown in FIG. 10C. A holding member 64 shown in FIG. 10C includes a hole portion 64a into which at least an end portion of the grip belt 13 can be inserted. When the grip belt 13 is held with respect to the holding member 64, the end portion of the grip belt 13 is inserted into the hole portion 64a, followed by screwing the screws 14. Each of the screws 14 is at least long enough to pass through the hole portion 64a from a top surface of the holding member 64 until it reaches the bottom of the hole portion 64a. With the configuration shown in FIG. 10C, the holding member 64 can function as a rubber foot of the electronic equipment. More specifically, when the electronic equipment is placed on a desk or the like, the holding member 64 shown in FIG. 10C comes into contact with a top surface of the desk, so that the electronic equipment can be kept in a stable position. The holding member 64 preferably is made of a soft material.

Figure 10D:
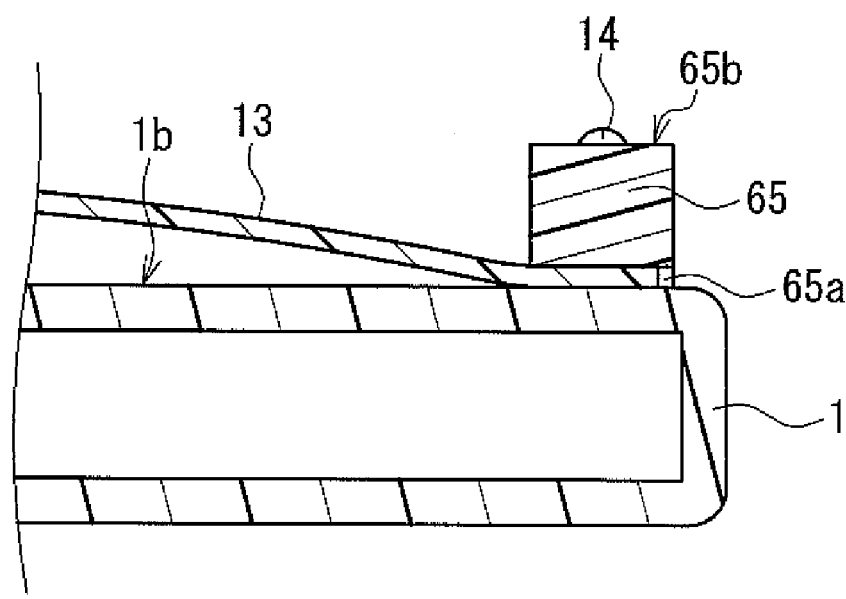
FIG. 10D is a cross-sectional view showing a modified example of the configuration for attaching the grip belt.

Further alternatively, the holding member may be formed as shown in FIG. 10D. A holding member 65 shown in FIG. 10D includes a hole portion 65a into which at least the end portion of the grip belt 13 can be inserted. When the grip belt 13 is held with respect to the holding member 65, the end portion of the grip belt 13 is inserted into the hole portion 65a, followed by screwing the screws 14. Each of the screws 14 is at least long enough to pass through the hole portion 65a from a top surface of the holding member 65 until it reaches the first housing 1. With the configuration shown in FIG. 10D, the holding member 65 can function as a rubber foot of the electronic equipment. More specifically, when the electronic equipment is placed on a desk or the like, the holding member 65 shown in FIG. 10D comes into contact with a top surface of the desk, so that the electronic equipment can be kept in a stable position. The holding member 65 preferably is made of a soft material.

Although the notebook PC provided with the first housing 1 and the second housing 2 has been given as an example of the electronic equipment in the present embodiment, electronic equipment formed of a single housing is also applicable.

Further, the first housing 1 and the housing of the electronic equipment 81 in the present embodiment are exemplary housings. The grip belt 13 in the present embodiment is an exemplary grip belt. The screw holes 12 in the present embodiment are an exemplary belt locking portion. The screw hole 15 and the concave portions 17 in the present embodiment are an exemplary protruding member locking portion. The protruding members 11 and 71 in the present embodiment are exemplary protruding members. The holding members 63, 64, and 65 are exemplary protruding locking portions.

The electronic equipment of the present application is useful as mobile equipment that can be held with one hand.

The application may be embodied in other forms without departing from the spirit or essential characteristics thereof. The embodiments disclosed in this application are to be considered in all respects as illustrative and not limiting. The scope of the application is indicated by the appended claims rather than by the foregoing description, and all changes which come within the meaning and range of equivalency of the claims are intended to be embraced therein.

What is claimed is:

1. Electronic equipment comprising:
   a housing;
   a pair of belt locking portions that are formed on one surface of the housing and are capable of locking a grip belt; and
   a protruding member locking portion that is formed on the one surface and is capable of locking a protruding member;
   wherein the protruding member is attachable/detachable with respect to the protruding member locking portion.

2. The electronic equipment according to claim 1, wherein the protruding member locking portion is formed at a position on the one surface that is opposed to the grip belt locked by the belt locking portion.

3. The electronic equipment according to claim 1, wherein an end side of the grip belt between the pair of belt locking portions is present within a region of an outer frame portion formed of the protruding member and the one surface.

4. The electronic equipment according to claim 1, wherein the protruding member is inclined with respect to a center line as a perpendicular bisector of a line between the pair of belt locking portions.

5. The electronic equipment according to claim 1, wherein the protruding member includes concave portions that are capable of being engaged with user's fingers.

6. The electronic equipment according to claim 1, further comprising a protruding locking portion that is capable of locking the grip belt,
   wherein the protruding locking portion has a height from the one surface of the housing that is not lower than a protrusion height of the protruding member.

7. The electronic equipment according to claim 6, wherein the protruding locking portion is attachable/detachable with respect to the one surface of the housing.

* * * * *